Aug. 11, 1936.  H. G. BLANCHARD  2,050,416
ROUNDING AN END OF A METAL PART
Filed July 29, 1933
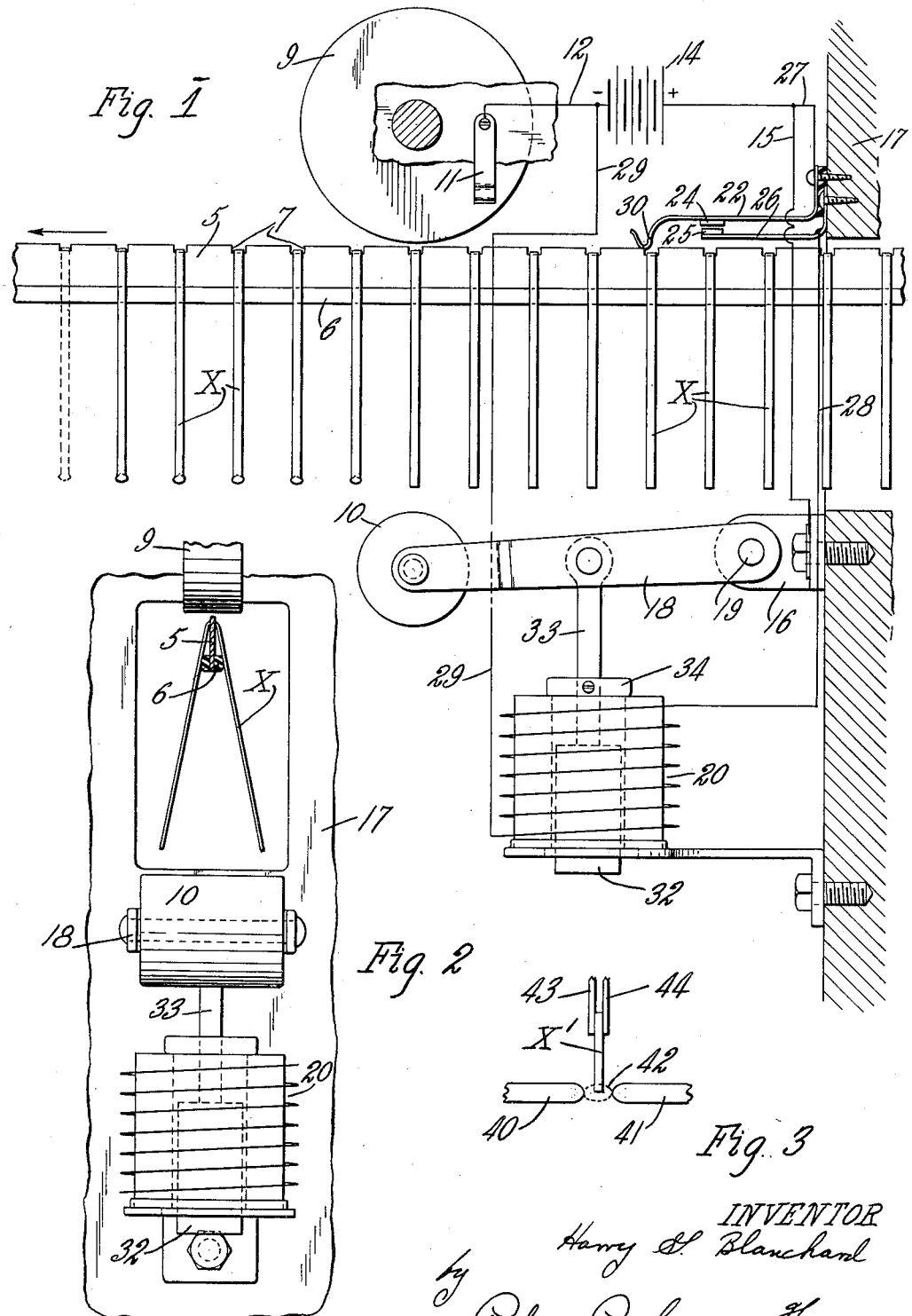
INVENTOR
Harry G. Blanchard
by Parker, Grocknow & Firmer
ATTORNEYS Patented Aug. 11, 1936

2,050,416

UNITED STATES PATENT OFFICE 2,050,416

ROUNDING AN END OF A METAL PART

Harry G. Blanchard, Buffalo, N. Y.

Application July 29, 1933, Serial No. 682,841

12 Claims. (Cl. 219—15)

This invention relates to methods and apparatus for forming enlarged or blunted ends on wire articles, and also to the articles thus formed.

In cases where articles are formed from wire, metal strips, or the like, the free ends are generally cut and these cut ends usually have sharp edges, corners, or projections which may be objectionable in the use of the articles, or it may be desirable to form enlarged ends on such articles for various reasons. For example, in the manufacture of hair pins made from metal wire, the wire is cut into lengths from which the hair pins are formed, and the cut ends of the wire frequently have sharp edges or projections, which, if not removed, will injure or cut the scalp or the hair. In the case of hair pins, attempts to overcome this objection have been made by grinding the sharp ends to dull them, or by other means for eliminating any sharp edges or projections, and in some cases, these sharp edges or projections have been merely covered by a ball or globule of the paint or finishing composition employed on the pins. The first mentioned expedients are expensive and add materially to the cost of the production of the pins, and the use of globules or balls of paint is not satisfactory, since the paint or coating composition is apt to be removed through use either by chipping or breaking off or by wearing away or by dissolving.

The objects of this invention are to provide inexpensive and rapid means for eliminating the sharp ends or projections on metal articles; also to provide such ends with enlargements formed by means of electric arcs; also to provide a process of this kind in which the ends of wire articles are made blunt by an electric arc formed by breaking an electric circuit including the article itself; also to provide apparatus by means of which the forming of blunt ends on wire articles can be automatically accomplished; also to provide wire articles with improved blunted or enlarged ends; also to improve methods and apparatus for producing blunted or enlarged ends on wire articles in other respects hereinafter specified.

In the accompanying drawing:

Fig. 1 is an elevation, partly diagrammatic, of an apparatus embodying this invention for producing blunted ends on wire articles.

Fig. 2 is an elevation thereof.

Fig. 3 is a fragmentary elevation showing a modified form of my invention.

I have found that the ends of such wire articles can be blunted or rounded, and if desired, provided with enlarged bulb-like ends, by fusing the ends of the articles by means of electric arcs. The fused or liquefied metal tends, because of surface tension, to form into a drop, globule or other form with a rounded periphery, and upon cooling, the end of the articles retains such form. The electric arc to which the articles are subjected may be formed between the article and another terminal or electrode, in which case, the article itself constitutes one of the two electrodes, or the end of the article may be merely passed through an electric arc between two separated electrodes.

My improved process, as illustrated in Figs. 1 and 2, includes the steps of connecting the wire articles with a source of electric current in such a manner that the end or ends to be treated are contacted with a terminal connected with such electric circuit for a very brief interval of time, and upon moving the terminal away from the end of the pin, an electric arc is formed which fuses the end of the wire article. This fusing of a small quantity of metal at the end of the pin by means of the arc results in the forming of a globule or drop of liquid or molten metal at the end of the wire article, and this liquid or molten metal follows the tendency of all liquids to gather into a drop or globule of rounded contour because of surface tension. Because of the small size of the particle of molten metal and of its connection with adjacent parts of the wire article which are not fused, and which consequently are relatively cool, the molten metal quickly solidifies and forms a rounded or bulb-like end on the wire article. The contact of the rough end of the wire article with a terminal of the electric circuit may, of course, also result in a local heating of the wire article at its end, due to the fact that any sharp edges or projections on the end of the wire article would offer a higher resistance to the flow of current through the same, than through the body portion of the wire article. This high resistance, of itself, may be sufficient to cause fusing of the metal at the end of the article, but I prefer not to depend upon this manner of fusing the end of the article, since the moving of the terminal which contacts with the rough end of the wire article out of contact therewith results in the forming of an electric arc which is very positive and reliable in its action of fusing the metal at the end of the article.

I have also found that the best results are obtained by using a carbon electrode for contact with the end of the wire article, since the carbon forms a more intense and prolonged arc than other materials, although it is not intended to limit the invention for use in connection with a carbon terminal. When used in connection with direct current, I prefer to connect the carbon member to the positive terminal of the electric circuit, so that a carbon arc of very high temperature is formed between the carbon electrode and the end of the article. I have also found that alternating current may equally well be used in fusing the ends of the articles, and if the frequency of the alternating current is not too low, the results produced are substantially as good as those produced by direct current. When lower frequencies, such as 40 cycles per second or less, are employed, it may be necessary to employ means to prevent separation of the wire article and the electrode or terminal at the instant that the current wave is approximately at the zero point. I have found, for example, that very good results can be obtained with a potential of approximately 30 volts, but lower and higher voltages may be employed, and the voltage may be varied to change the size of the drop or globule formed on the end of the wire article. The voltage may also have to be varied when different metals are employed.

I have also found that it is desirable in many instances to have the end of the article to be rounded extend downwardly during the fusing of the metal, so that the drop of molten metal will hang substantially straight down from the adjacent part of the article, and it is also desirable to have the terminal or electrode which forms the arc with the article move away from the article substantially in the direction of its length. This ensures the rounding of the entire end of the article, since it will be obvious that if the electrode moves away diagonally from one corner of the article or from a side of the end, the metal at the other corner or side may not be fused, thus leaving such other corner or side rough or sharp. It is, however, possible under some conditions to obtain the desired results by supporting the article at any angle to the vertical or with the end to be rounded at the upper extremity of the article.

The accompanying drawing shows merely one form of apparatus that may be used in carrying out my method and it will be understood that the particular apparatus shown in the drawing is merely illustrative of one embodiment of my invention, which is by no means limited to the particular apparatus disclosed. In the drawing, the apparatus is shown for use in connection with the forming of blunt or rounded ends on hair pins, but it will be clearly understood that my invention is equally applicable to any other metal articles on which it is desired to form rounded or enlarged ends.

In the particular apparatus shown in the drawing, the articles X are fed on a belt or conveyor into position to have the ends thereof rounded or made blunt. This conveyor includes a metal band or strip 5 having an enlarged flange or projection 6 at the lower portion thereof, and may be provided with a series of notches 7 into which the bent or middle portions of the hair pins may enter, and the enlarged part 6 may be made of rubber or other flexible material to enable the band or belt 5 to pass around pulleys and the like. If desired, the rubber or flexible part 6 may be replaced by a series of rigid projections spaced apart to permit the band or conveyor 5 to flex in passing around a pulley. The lower part 6 of the conveyor may in some cases be entirely omitted, if desired, but in the construction shown, it serves the purpose of insuring the spreading out of the legs of the hair pin X, so that the ends of these legs will be spaced apart when operated upon by the apparatus. Any other conveyor for the wire articles to be operated upon may, of course, be employed in place of the one shown, the conveyor being in each case formed to carry the articles that are being operated upon.

9 represents a roll or terminal for contacting with the wire articles to connect the same with an electric circuit, and 10 represents the other terminal also connected with the electric circuit for contacting with the ends of the articles to produce therewith electric arcs for fusing some of the metal at the ends of the articles. In the construction shown, the terminals are in the form of rolls or cyinders, the peripheries of which contact with the articles, and the terminal 9 may be made of metal while the terminal 10 is preferably made of carbon. These terminals as shown are rotatably mounted, but it will be understood that terminals of any other suitable or desired form may be employed. If the belt or conveyor 5 travels continuously, it may be desirable to provide suitable means for rotating the members 9 and 10 at the same peripheral speeds at which the belt 5 is travelling, so that there will be no relative motion between the articles and the parts of the terminals or rolls with which they contact. Such driving means are not shown in the accompanying drawing, and in case the conveyor or belt moves intermittently, such driving means are not necessary. It may also be unnecessary to provide such driving means, if the contact with the wire articles is of such short duration that the amount of relative movement of the article with reference to the contact member is negligible. The contact member 9, for example, may be connected to an electric circuit by means of a spring contact brush or member 11 connected by means of a conductor 12 with a suitable source of power 14 and the other terminal 10 may be connected to this source of power by means of another conductor 15, which in the accompanying drawing is shown as connected with a bracket or supporting lug 16 suitably secured on a frame member or fixed part 17 of the apparatus. The member 10 is movable toward and from the work and in the construction shown, is mounted in the bifurcated end of a swinging arm 18 pivoted at 19 on the lug or bracket 16. The arm 18 and the lug or bracket 16 are made of conducting material so that current from the conductor 15 finds its way to the terminal or contact 10.

The making and breaking of an electric circuit including the wire articles may be accomplished by any suitable or desired means. To illustrate one embodiment of my invention, a solenoid 20 is employed for moving the terminal or contact member 10 into engagement with the article and the notches or recesses 7 in the conveyor or carrier for the articles 5 are employed to actuate a make and break device for supplying current to the solenoid. For this purpose, a spring member 22 is employed, secured at one end on a fixed frame 17 of the apparatus and having the other end yieldingly engaging the upper edge of the conveyor or band 5. This spring member is provided with a suitable terminal or contact 24 adapted to engage with another terminal 25 mounted on an arm 26. A conductor 27 which may also be connected with the source of power 14 connects with the spring arm 22 and another conductor 28 connects with the fixed bracket or arm 26 and with one terminal of the solenoid, the other end of which is connected by means of a conductor 29 with the source of power. Consequently, it will be obvious that when the end 30 of the spring member 22 enters into a notch or recess 7, the contact 24 will move into engagement with the contact 25, thus completing the circuit to the solenoid. This will cause the solenoid to quickly lift the core 32, which is connected by means of a link 33 with the arm 18 on which the movable contact member 10 is mounted. Immediately after this contact is made, the spring arm 22 will again be raised out of the notch or recess 7 in the belt, thus causing a breaking of the circuit, which will cause the contact member 10 to move away from the article by gravity, a collar or stop 34 limiting the downward movement of the core.

In moving upwardly into contact with the article, the member 10 will move the article into contact with the roll 9, while the lower sharp end or ends of the article contact with the terminal 10. Any rough ends or edges on the lower end of the article will cause this projection to act as a conductor of greatly reduced cross section, so that it will become heated, and under correct conditions, the ends become fused. If the current is then interrupted without withdrawing the terminal from the end of the article, a rounded or enlarged end is produced. It is, however, not necessary to depend upon this heating of the article during its contact with the terminal 10, since upon downward movement of the terminal, as it moves away from the end or ends of the article, an electric arc is produced, the high temperature of which readily fuses or melts the metal at the adjacent end or ends of the wire article. Upon further withdrawal of the terminal 10 from the end of the article, this arc, of course, becomes broken and the metal which has become fused and which, while in liquid condition, has collected because of surface tension in the form of a drop or globule on the bottom of the wire article, quickly becomes chilled and solidified and remains in this form.

The roll or cylindrical electrode 10 in the construction shown is made of sufficient width so as to engage the ends of both legs of a hair pin. If the legs of the hair pin are of unequal lengths, or if for other reasons it is preferred to operate on one leg of the hair pin at a time, it will be obvious that an electrode of less width than the electrode 10 can be used and the apparatus can be duplicated to the extent of providing a second electrode contacting with the other leg of the hair pin after the first electrode has performed its operation. Other modifications of the apparatus are, of course, also possible.

In the construction shown in Fig. 3, a pair of electrodes 40 and 41 are employed between which an arc 42 is formed. This arc may, for example, be a flaming arc. X' represents a wire article, such as a nail or pin, or a leg of a hair pin, which is suitably clamped or held between a pair of members 43 and 44 of a carrier or conveyor, in such a manner that during the travel of the clamping members, the article X' will be carried through the arc 42 so that the lower end thereof becomes fused. The rate of travel is controlled so that the end of the article becomes fused to the desired extent to permit a rounded end to be formed thereon by surface tension. In the arrangement shown in this figure, the article itself does not become a part of the circuit supplying current to the arc.

The advantages resulting from this invention will be obvious. The arc produces merely localized melting at the extreme end of the article with only slight heating of the other portions of the article. The cost of forming the rounded ends on the articles is almost negligible and the time required for the entire operation is a part of a second, so that the process and apparatus described are readily adaptable to quantity production. In the manufacture of hair pins, the method described is particularly desirable, since it is very positive and speedy in producing the desired results, particularly when compared with the grinding of the ends which is now commonly employed. The sizes and shapes of the rounded ends can be varied as desired by control of the voltage, current, direction of flow, time of contact, and time of exposure of the end to the arc, and also by the speed of separation of the article and electrode.

Hair pins or other wire articles made in accordance with this invention are characterized in that the metal of the rounded ends is harder than the metal of the body portion of the articles. This may be due either to the addition of carbon to the steel as a result of the carbon arc, or to the fact that the fusing or rounding of the ends of the articles is effected in such a small part of a second that the metal immediately adjacent to the ends is not raised in temperature. Consequently, when the arc is broken, the fused metal chills so rapidly because of proximity to cold portions of the articles, that the metal at the ends is hardened by tempering.

I claim as my invention:

1. A method of rounding an end of a metal member, which includes forming an electric arc in a gaseous medium at said end of said member between said member and a carbon electrode to fuse the end of said member, and breaking the arc before the body portion of said member becomes materially heated to permit the fused metal on the end of said member to collect by surface tension into a rounded part integral with said metal member.

2. A method of rounding an end of a metal member, which includes connecting said member to the negative terminal of an electric circuit, bringing said end of said member and a carbon terminal connected to the positive end of said electric circuit momentarily into contact in a gaseous medium with said member and quickly withdrawing the same to form an instantaneous arc which fuses the end of said metal member and causes the fused metal of said member to collect by surface tension into rounded form.

3. A method of removing sharp projections from the end of a wire member without materially raising the temperature of the body portion of the member, which includes fusing the metal at the end of the wire member by forming an electric arc between the end of the wire member and an electrode during withdrawal of the end of the wire from momentary contact with the electrode.

4. A method of forming a blunt end on a tempered steel wire member without materially raising the temperature of any portion of said member except at said end, which includes by contacting the end of said member with an electrode, momentarily completing a circuit through a portion of said member and breaking said circuit at said end of said member to form an electric arc, and fusing a portion of said end of said member by the heat of said arc.

5. A method of forming a blunt end on a wire member without materially raising the temperature of said wire member, which includes completing an electric circuit momentarily through said end of said member and a carbon electrode, and breaking said circuit by separating said end of said wire member and said carbon electrode to form an electric arc which fuses the metal of said end to form a blunt end on said member.

6. A method of removing rough edges from the ends of a wire hairpin, which includes momentarily completing an electric circuit through a portion of said hairpin to an end thereof and through an electrode, and fusing the metal at said end by separating said end from said electrode to form an arc which fuses the rough edges of said ends to form rounded ends.

7. A method of forming a blunt end on a wire member, which includes connecting said wire member with a source of electric current, quickly making and breaking an electric circuit through said member by contacting said end with an electrode connected with said source of electric current to produce an electric arc of momentary duration which fuses said end of said member without material rise in temperature of any portion of said member except said end.

8. A method of forming a blunt end on a hairpin, which includes the step of momentarily exposing said end to the action of an electric arc to fuse any sharp projections of said end, the length of exposure of said end to said arc being such as to avoid material rise in temperature of portions of said hairpin not in immediate proximity to said end.

9. A method of forming a blunt end on a wire member, which includes connecting said wire member with a source of electric current, quickly making and breaking an electric circuit through said member by contacting said end with a carbon electrode also connected with said source of electric current to produce an electric arc of momentary duration which fuses the extreme end of said member without material rise in temperature of any portion of said member except the end portion thereof.

10. A member of steel wire whose tip end only has been smoothly finished by being momentarily heated to the fusing point by an electric arc created in a gaseous medium by the separation of that tip end from contact with a carbon electrode included in a closed electric circuit with said member.

11. A member of steel wire whose tip end only has been smoothly finished by being momentarily heated to the fusing point by an electric arc created in a gaseous medium by the separation of that tip from contact with a carbon electrode included in a closed electric circuit with said member, said smoothly finished tip being harder than other portions of said steel wire member.

12. A steel wire hair pin whose tip ends only have been smoothly finished by being momentarily heated to the fusing point by electric arcs created in a gaseous medium by the separation of the tips from contact with a carbon electrode included in a closed electric circuit with said member, said smoothly finished tips being harder than other portions of said hair pin.

HARRY G. BLANCHARD.